US012087167B2

(12) United States Patent
Greenberger et al.

(10) Patent No.: US 12,087,167 B2
(45) **Date of Patent: *Sep. 10, 2024**

(54) AUTONOMOUS PRESENTATION OF A SELF-DRIVING VEHICLE

(71) Applicant: Maplebear, Inc., San Francisco, CA (US)

(72) Inventors: Jeremy Adam Greenberger, Raleigh, NC (US); James Robert Kozloski, New Fairfield, CT (US); Clifford A. Pickover, Yorktown Heights, NY (US)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,361

(22) Filed: Jul. 19, 2019

(65) Prior Publication Data

US 2019/0340929 A1 Nov. 7, 2019

Related U.S. Application Data

(63) Continuation of application No. 15/837,733, filed on Dec. 11, 2017, now Pat. No. 10,580,305, and a continuation of application No. 15/419,638, filed on Jan. 30, 2017, now Pat. No. 10,453,345.

(51) Int. Cl.

*G05D 1/00* (2006.01)
*G06Q 50/10* (2012.01)
*G08G 1/00* (2006.01)

(52) U.S. Cl.

CPC ............ *G08G 1/202* (2013.01); *G06Q 50/10* (2013.01)

(58) Field of Classification Search

CPC ...... G08G 1/0125; B64C 39/02; B64C 39/024
See application file for complete search history.

(56) References Cited

U.S. PATENT DOCUMENTS

| | | | | |
|---|---|---|---|---|
| 6,652,351 | B1 * | 11/2003 | Rehkemper | A63H 13/02 446/376 |
| 6,798,357 | B1 * | 9/2004 | Khan | G08G 1/0104 701/117 |
| 8,527,199 | B1 | 9/2013 | Burnette et al. | |
| 8,831,813 | B1 * | 9/2014 | Ferguson | B60W 50/085 701/28 |
| 8,965,621 | B1 * | 2/2015 | Urmson | G01S 17/86 701/23 |
| 9,037,852 | B2 | 5/2015 | Pinkus et al. | |

(Continued)

OTHER PUBLICATIONS

Mel et al., "The NIST Definition of Cloud Computing", Recommendations of the National Institute of Standards and Technology, Sep. 2011, 7 pages.

(Continued)

*Primary Examiner* — Jess Whittington
(74) *Attorney, Agent, or Firm* — Fenwick & West LLP

(57) ABSTRACT

Techniques for facilitating the autonomous presentation of a self-driving vehicle are provided. In one example, a method can include a system operatively coupled to a processor, where the system: determines a feature of a self-driving vehicle based on information regarding an entity in a pending transaction; determines a task to be performed by the self-driving vehicle based on the feature; and generates an instruction for the self-driving vehicle to perform the task.

19 Claims, 7 Drawing Sheets

(56) References Cited

U.S. PATENT DOCUMENTS

| | | | | |
|---|---|---|---|---|
| 9,104,201 | B1 * | 8/2015 | Pillai | G08G 5/0026 |
| 9,139,199 | B2 | 9/2015 | Harvey | |
| 10,049,505 | B1 | 8/2018 | Harvey et al. | |
| 10,140,874 | B2 * | 11/2018 | Yang | G08G 5/0078 |
| 10,351,240 | B1 * | 7/2019 | Sills | B64F 1/00 |
| 10,453,345 | B2 | 10/2019 | Greenberger et al. | |
| 2003/0046179 | A1 | 3/2003 | Anabtawi et al. | |
| 2003/0126041 | A1 | 7/2003 | Carlstedt et al. | |
| 2006/0004488 | A1 | 1/2006 | Sugiyama et al. | |
| 2007/0129879 | A1 | 6/2007 | Fedora | |
| 2007/0273534 | A1 | 11/2007 | McGinn et al. | |
| 2013/0061044 | A1 | 3/2013 | Pinkus et al. | |
| 2014/0172412 | A1 * | 6/2014 | Viegas | G06F 16/951<br>704/9 |
| 2014/0199962 | A1 | 7/2014 | Mohammed et al. | |
| 2015/0100448 | A1 * | 4/2015 | Binion | G06Q 30/08<br>705/26.3 |
| 2015/0185034 | A1 | 7/2015 | Abhyanker | |
| 2015/0241241 | A1 | 8/2015 | Cudak et al. | |
| 2015/0262239 | A1 | 9/2015 | Goralnick | |
| 2015/0302342 | A1 | 10/2015 | Yeh | |
| 2015/0348335 | A1 | 12/2015 | Ramanujam | |
| 2015/0356665 | A1 * | 12/2015 | Colson | G06Q 30/0635<br>705/26.81 |
| 2016/0028471 | A1 * | 1/2016 | Boss | H04W 28/0289<br>455/406 |
| 2016/0042303 | A1 * | 2/2016 | Medina | G06Q 50/40<br>705/5 |
| 2016/0092976 | A1 | 3/2016 | Marusyk et al. | |
| 2016/0127373 | A1 | 5/2016 | Avary et al. | |
| 2016/0207626 | A1 * | 7/2016 | Bailey | B64C 39/022 |
| 2016/0210675 | A1 * | 7/2016 | Smart | G06Q 50/26 |
| 2016/0286629 | A1 | 9/2016 | Chen et al. | |
| 2016/0288323 | A1 * | 10/2016 | Mühlig | B25J 9/163 |
| 2016/0307447 | A1 * | 10/2016 | Johnson | G08G 5/0034 |
| 2016/0328979 | A1 * | 11/2016 | Postrel | H04W 4/40 |
| 2016/0334789 | A1 | 11/2016 | Park | |
| 2017/0061826 | A1 * | 3/2017 | Jain | G09B 5/06 |
| 2017/0083748 | A1 * | 3/2017 | Zhou | G06K 9/6228 |
| 2017/0123418 | A1 * | 5/2017 | Erickson | G07C 5/0808 |
| 2017/0123421 | A1 | 5/2017 | Kentley et al. | |
| 2017/0132118 | A1 | 5/2017 | Stefan et al. | |
| 2017/0136842 | A1 * | 5/2017 | Anderson | B60N 2/0244 |
| 2017/0164423 | A1 | 6/2017 | Ross et al. | |
| 2017/0225336 | A1 * | 8/2017 | Deyle | B25J 13/006 |
| 2017/0270794 | A1 * | 9/2017 | Sweeney | H04W 4/02 |
| 2017/0311127 | A1 * | 10/2017 | Murphy | H04W 4/026 |
| 2017/0334559 | A1 * | 11/2017 | Bouffard | G05D 1/0202 |
| 2017/0355453 | A1 * | 12/2017 | Kim | B64D 47/08 |
| 2018/0033217 | A1 | 2/2018 | Komada | |
| 2018/0174265 | A1 * | 6/2018 | Liu | G06Q 30/0639 |
| 2018/0196428 | A1 * | 7/2018 | Pilutti | B60W 30/18 |
| 2018/0205682 | A1 * | 7/2018 | O'Brien, V | H04L 51/10 |
| 2019/0361694 | A1 * | 11/2019 | Gordon | G06F 1/3231 |

OTHER PUBLICATIONS

Non-Final Office Action received for U.S. Appl. No. 15/419,638 dated Sep. 17, 2018, 30 pages.
List of IBM Patents or Applications Treated as Related.
Final Office Action received for U.S. Appl. No. 15/419,638 dated Jan. 23, 2019, 32 pages.
Non-Final Office Action received for U.S. Appl. No. 15/837,733 dated Jan. 22, 2019, 43 pages.
Khazan, Olga, "This App Reads Your Emotions on Your Face", URL: https://www.theatlantic.com/technology/archive/2014/01/this-app-reads-your-emotions-on-your-face/282993/, Jan. 15, 2014, 8 pages.
Final Office Action received for U.S. Appl. No. 15/837,733 dated Jul. 1, 2019, 34 pages.
United States Office Action, U.S. Appl. No. 16/745,818, dated Jun. 28, 2021, 18 pages.
United States Office Action, U.S. Appl. No. 16/745,818, dated Feb. 26, 2021, 16 pages.
United States Office Action, U.S. Appl. No. 16/745,818, dated Oct. 13, 2021, 18 pages.
United States Office Action, U.S. Appl. No. 16/745,818, Jul. 29, 2022, 19 pages.
United States Office Action, U.S. Appl. No. 16/745,818, Jan. 9, 2023, 14 pages.

* cited by examiner

300

600

AUTONOMOUS PRESENTATION OF A SELF-DRIVING VEHICLE

BACKGROUND

The present invention relates generally to self-driving vehicles, and in particular to facilitating a presentation of one or more self-driving vehicle features.

SUMMARY

Embodiments of the present invention include systems, computer-implemented methods, and/or computer program products.

According to an embodiment, a computer-implemented method can include determining, by a system operatively coupled to a processor, a feature of a self-driving vehicle based on information regarding an entity. The computer-implemented method can further include determining, by the system, a task that can be performed by the self-driving vehicle based on the feature. The computer-implemented method can also include generating, by the system, an instruction for the self-driving-vehicle to perform the task.

Other embodiments include a system and a computer program product.

DETAILED DESCRIPTION

Figure 1:
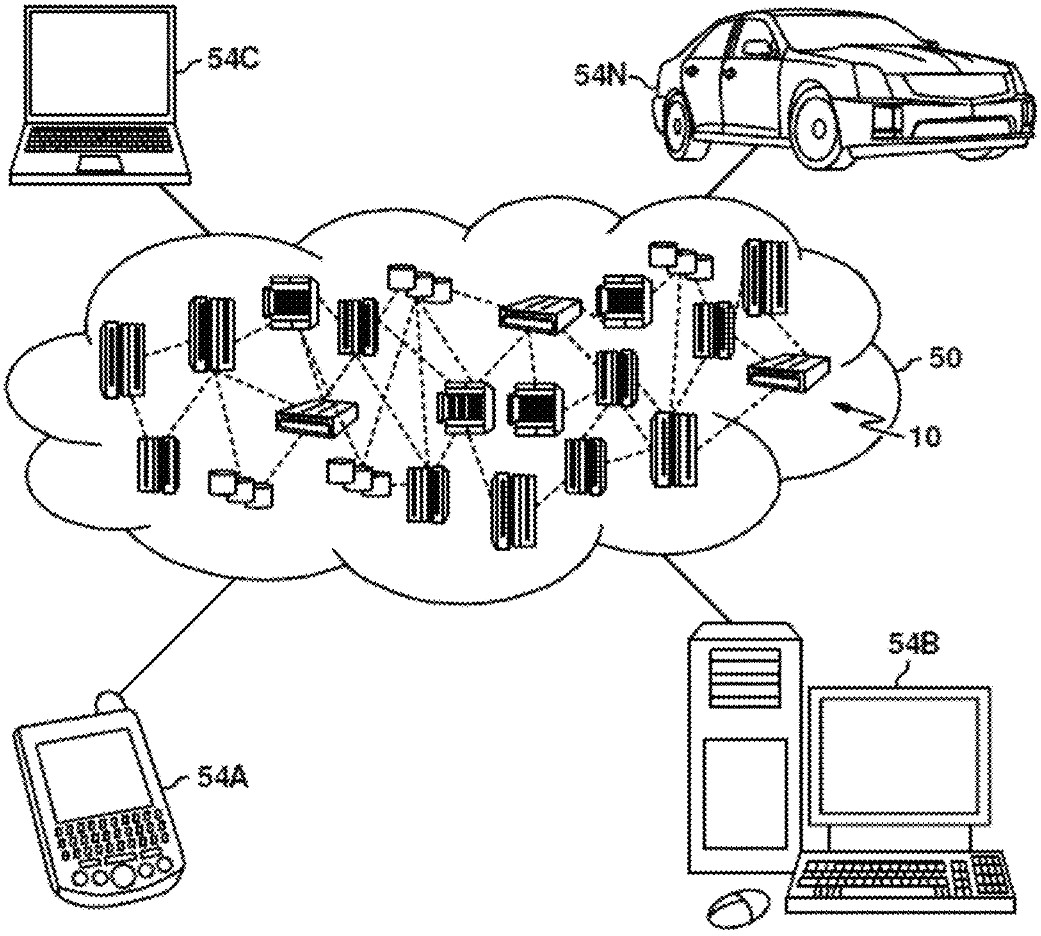
FIG. 1 depicts a cloud computing environment in accordance with one or more embodiments of the present invention.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
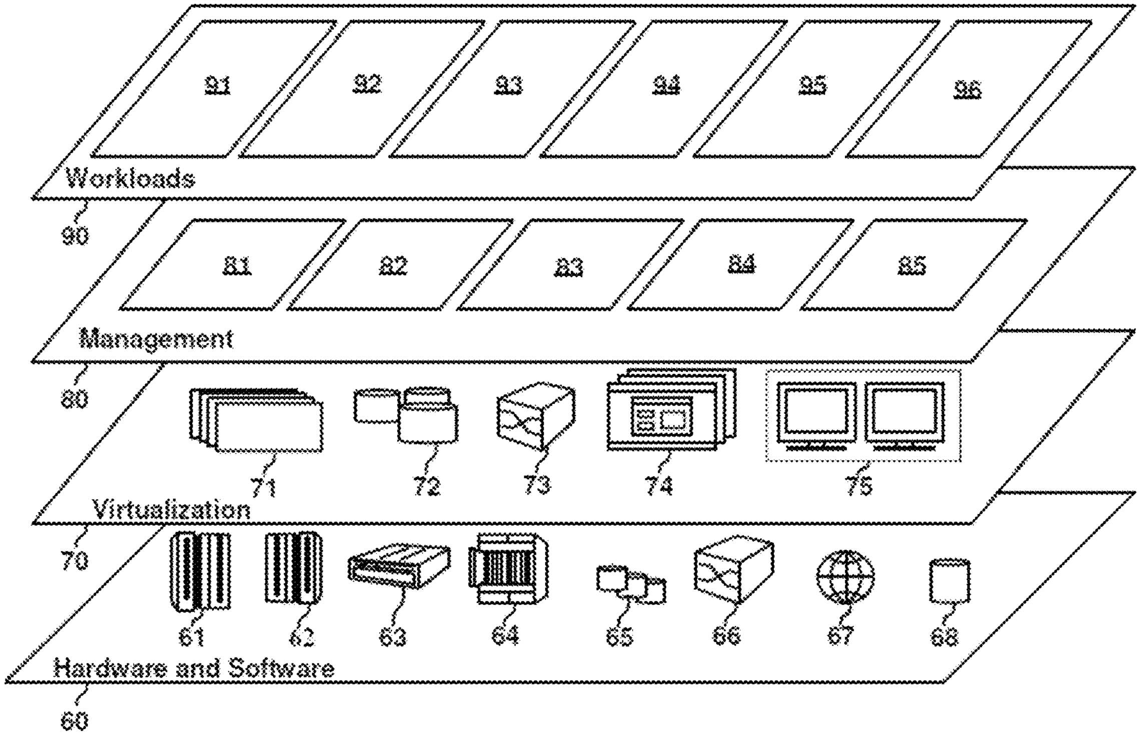
FIG. 2 depicts abstraction model layers in accordance with one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided. Repetitive description of like elements employed in other embodiments described herein is omitted for sake of brevity.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and presentation management 96.

With the rise of autonomous computer technology, self-driving vehicles are quickly becoming a common occurrence on public roadways. For example, self-driving vehicles are being utilized by taxi services to reduce labor costs and are becoming a sales feature in new automobile models. Self-driving vehicles are capable of collecting large amounts of sensory data and maneuvering with high precision and accuracy. Yet, much of the SDV capability remains unknown to potential consumers. As used herein, an “SDV” can refer to a vehicle capable of autonomously performing motor functions, independent of an operator, to move from one location to another in a controlled manner (e.g., in a manner that is not random or accidental). The SDV can include, but not limited to: an automobile (e.g., a car, a truck, a utility vehicle (SUV), a tractor trailer, and/or the like), mobile construction equipment (e.g., a backhoe, a bulldozer, a dump truck, and/or the like), an aircraft, a drone, a motorized vehicle, a scooter, a cart, an all-terrain-vehicle (ATV), an amphibious vehicle, a boat (e.g., yacht, a speed boat, a sail boat, and/or the like), or the like. All such embodiments are envisaged herein. As used herein, the term “entity” can include, but is not limited to, a human or a machine.

One or more embodiments of the present invention can be directed to computer processing systems, computer-implemented methods, and apparatus and/or computer program products that can facilitate efficiently and automatically (e.g., without direct human involvement) presentation of one or more SDV features of interest to a potential consumer. For example, automatically presenting features of a SDV can include the SDV driving itself to a location of a potential buyer of the vehicle. In another example, a SDV can generate audio to communicate with a potential buyer of the SDV in order to express the performance and/or manufacturing specifications of the SDV. In another example, a SDV can autonomously perform maneuverability exercises during a test drive with a potential buyer of the SDV in order to demonstrate the SDV handling capabilities. In one or more embodiments, a SDV can facilitate the sale, rental, lease, or service (e.g., taxi service, limousine service) of itself or another SDV to a potential consumer.

In order to facilitate presenting features of a SDV, one or more embodiments described herein can include sensory techniques that involving the SDV observing the environment of its location, the expressions of a potential consumer, and one or more contexts of a potential event to determine presentation features that will facilitate completion of the event. For example, the SDV can include features that observe expressions of a potential consumer to determine contexts such as, but not limited to: whether the potential consumer has a pet; family size of the potential consumer; the potential consumer's satisfaction as the subject event progresses; and any special needs (e.g., the need for a cane, walker, wheelchair, or the like) of the potential consumer or of a family member of the potential consumer. Also, the SDV can utilize the determined contexts to identify one or more particular features that may interest the potential consumer. Further, the SDV can perform tasks that highlight the one or more identified features to the potential consumer. For example, the SDV can play an audio recording or script to a potential consumer (e.g., via the speakers of the SDV) that notes the spaciousness of the SDV in response to observing that the potential consumer owns one or more pets and/or a large family. In another example, the SDV can perform turns, accelerations, decelerations, or a combination thereof to demonstrate the handling (e.g., turning radius) of the SDV in response to observing the potential consumer smiling during a test drive of the SDV. In another example, the SDV can open its doors to demonstrate the automatic nature of the door functionality in response to observing that the potential consumer has a special need that would render entering a conventional vehicle difficult.

One or more embodiments of the computer processing systems, computer-implemented methods, apparatus and/or computer program products of the present invention, employ hardware and/or software to perform functions that are highly technical in nature, not abstract, and cannot be readily performed by the mental acts of a human. For example, a human, or even a plurality of humans, cannot analyze a potential consumer to identify fields of interest and generate electronic information that causes the SDV to perform one or more autonomous functions regarding the fields of interest in a manner that is as efficient, accurate, and effective as one or more embodiments of the present invention. Additionally, various embodiments of the present invention regard unique challenges not previously experienced in conventional business practices. For example, the subject computer processing systems, methods, apparatuses and/or computer program products of the present invention can facilitate an automated event. In some embodiments, the subject SDVs include technical features for determining one or more SDV features that a potential consumer may find appealing and for demonstrating the determined features. Software and/or hardware components can embody technical algorithms for performing operations that can not be readily performed by a human, such as: immediate awareness that a customer has entered a event location, categorization and identification of numerous (e.g. hundreds) of features regard numerous different SDVs, performing a choreographed presentation regarding multiple SDVs for each potential customer, and demonstrating high precision maneuverability exercises with the SDVs. Some embodiments of the present invention can include image processing features for determining a cognitive state of a potential consumer (e.g. whether the potential consumer is smiling, frowning, and/or surprised). Some embodiments of the present invention can include geo-fence techniques for determined the presence and/or location of a potential consumer. Also, some embodiments can include sharing information from one SDV to another for demonstrating one or more determined features.

Figure 3:
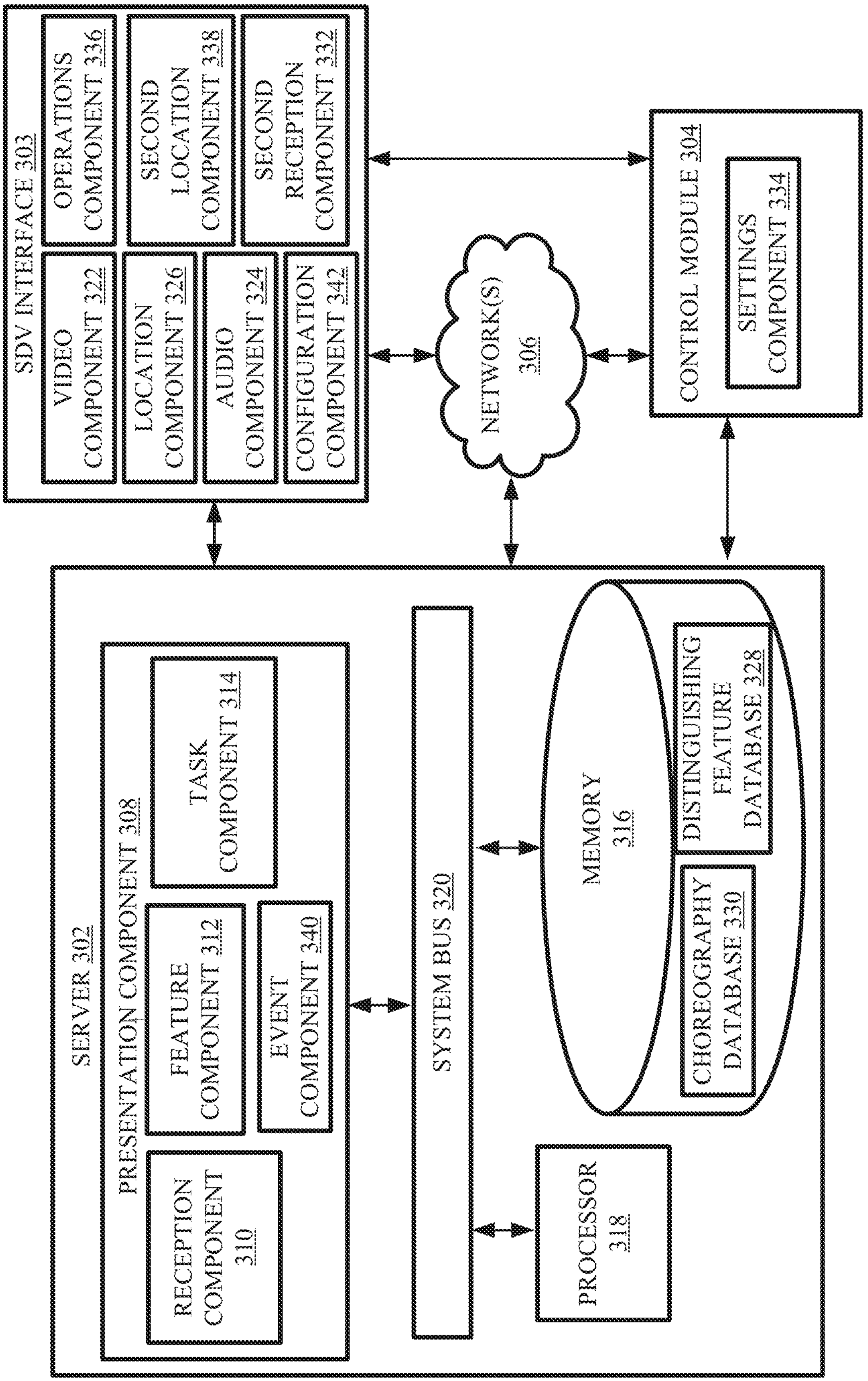
FIG. 3 illustrates a block diagram of an example, non-limiting system in accordance with one or more embodiments of the present invention.

FIG. 3 illustrates a block diagram of an example, non-limiting system 300 in accordance with one or more embodiments of the present invention. Aspects of systems (e.g., system 300 and/or the like), apparatuses or processes explained in the various embodiments of the present invention can include one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations of the various embodiments of the present invention. In various embodiments, one or more features of system 100 can communicate and/or utilize various aspects of the cloud computing environment 50 (e.g. workloads layer 90).

As shown in FIG. 3, the system can include a server 302, one or more SDV interfaces 303, one or more control modules 304, and one or more networks 306. The server 302 can include presentation component 308, which can include reception component 310, feature component 312, and task component 314. The components included in the presentation component 308 can be electrically and/or communicatively coupled to each other. The server 302 can also include or otherwise be associated with at least one memory 316 that can store computer executable components (e.g., computer executable components that can include, but are not limited to, presentation component 308 and/or associated components). The server 302 can also include or be associated with at least one processor 318 that executes the computer executable components stored in the memory 316. The server 302 can further include a system bus 320 that can electrically couple the various components including, but not limited to, the presentation component 308 (and the associated components included in the presentation component 308), the memory 316, and/or the processor 318. While a server 302 is shown in FIG. 3, in other embodiments, any number of different types of devices can be associated with or include components shown in FIG. 3 as part of the presentation component 308. All such embodiments are envisaged.

The presentation component 308 can facilitate identifying one or more features that can encourage a potential consumer to complete the subject event; determining one or more tasks that a SDV can perform to demonstrate the one or more identified features to the potential consumer; and/or instructing one or more SDVs to perform the one or more determined tasks. The subject event can be, but is not limited to: a sales transaction, a leasing transaction, a for-hire transaction (e.g. a delivery service, a taxi service, a surveillance service, or the like), a rental transaction, or a combination thereof. Further, the subject event can be initiated and ended by the potential consumer. For example, the potential consumer can initiate the subject event by setting a custom preference via the control module 304. In another example, the potential consumer can initiate the subject event by entering a designated location (e.g. a car dealership) whereupon the control module 304 can send geographical data to the server 302 to facilitate a start to the subject event. In another example, the potential consumer can end the subject event by: selecting a SDV for the desired purpose of the event (e.g. selecting a SDV to be bought, leased, hired, or rented), executing a contract sent to the potential consumer by the system 300, choosing to terminate the subject event by making affirmative notice that the subject event is not desired (e.g. by a custom setting entered via the control module 304, by an observation collected by the SDV interface 303, or a combination thereof), or a combination thereof. Further, the subject event can remain pending as long as desired by the potential consumer (although access to the SDVs can be set to predetermined times and/or time intervals). For example, the subject event can remain pending days, weeks, or months.

The reception component 310 can receive or detect observations for processing by the presentation component 308. For example, the reception component 310 can receive video data regarding visual observations that can be made by the one or more SDV interfaces 303. The reception component 310 can also receive audio data regarding acoustic observations that can be made by the one or more SDV interfaces 303. Further, the reception component 310 can receive geographical data regarding the location of one or more SDVs, the location of one or more potential consumers, the location of the subject event, and/or a combination thereof that can be made by the one or more SDV interfaces 303.

In various embodiments, the reception component 318 can receive observations from one or more SDV interfaces 303. The one or more SDV interfaces 303 can include video component 322, audio component 324, and/or location component 326. Video component 322 can include one or more cameras positioned on the exterior of a SDV, the interior of a SDV, or a combination thereof. The one or more cameras can facilitate the navigation of the SDV to maneuver around obstacles and within defined parameters (e.g., within a defined lane of a roadway). Also, the one or more cameras can capture video data of a potential consumer and/or the potential consumer's gestures. Audio component 324 can include one or more microphones and speakers on the exterior of a SDV, the interior of a SDV, or a combination thereof. The one or more microphones can capture audio data of a potential consumer. Location component 326 can capture geographical data (e.g., a global positioning data) of a SDV, a potential consumer, or a combination thereof. The one or more SDV interfaces 303 can be accessible to the server 302 either directly or via one or more networks 306.

In one or more embodiments, reception component 310 can also receive, but is not limited to: video data, audio data, geographical data, or a combination thereof from the control module 304. Also, the reception component 310 can receive custom preferences from the control module 304. Custom preferences can include, but are not limited to, details of the subject event set by the potential consumer, such as, but not limited to: color/hue of a desired SDV; make and/or model of a desired SDV; desired price range of a SDV or SDV service; type of event (e.g., sale, lease, or rental of a SDV); desired date and time of the subject event; desired location of the subject event; and service criteria (e.g., beginning and end of a desired service regarding the SDV, such as a taxi service). The control module 304 can be accessible to the reception component 310 directly or via one or more networks 306.

The various components (e.g., server 302, SDV interface 303, and control module 304) of system 300 can be connected either directly or via one or more networks 306. Such networks 306 can include wired and wireless networks, including, but not limited to, a cellular network, a wide area network (WAN) (e.g., the Internet) or a local area network (LAN). For example, the server 302 can communicate with one or more SDV interfaces 303 and control modules 304 (and vice versa) using virtually any desired wired or wireless technology, including, for example, cellular, WAN, wireless fidelity (Wi-Fi), Wi-Max, WLAN, and etc. Further, although in the embodiment shown the presentation component 308 is provided on a server 302, it should be appreciated that the architecture of system 300 is not so limited. For example, the presentation component 308 or one or more components of presentation component 308 can be located at another device, such as a "peer" device (another server, a client device), etc.

Feature component 312 can analyze the one or more of the video data, audio data, geographical data, custom preferences, or a combination thereof to identify one or more distinguishing features of a SDV that may encourage a potential consumer to complete a subject event. The feature component 312 can identify the one or more distinguishing features based on observations captured by the one or more SDV interfaces 303, data received from the control module 304, custom preferences received from the control module 304, or a combination thereof. As used herein, the term "distinguishing feature" can refer to one or more characteristics of one or more SDVs that are particularly suited to meet one or more event requirements of a potential consumer. Also, as used herein, the term "event requirement" can refer to an assessment of the needs and/or desires of a potential consumer. Example requirements can include, but are not limited to, a preferred characteristic of a SDV (e.g., the potential consumer may desire a SDV based on hue, size, make, model, cost, or expenses); a monetary assessment (e.g., the potential consumer may desire a SDV based on the transaction being completed at or beneath a defined monetary cost); special needs assessment (e.g., the potential consumer may desire a SDV that facilitates tasks the potential consumer may find physically challenging); family assessment (e.g., the potential consumer may desire a SDV based on the size and composition of a potential consumer's family); a safety assessment (the potential consumer may desire a SDV based the safety record or safety score of the SDV); pet assessment (e.g., the potential consumer may desire a SDV based on pets owned by the potential consumer).

The feature component 312 can analyze any of the inputs received by the reception component 310 (e.g., observations captured by the one or more SDV interfaces 303, data sent from the control module 304, custom preferences sent from the control module 304, or a combination thereof) to determine one or more event requirements (e.g., needs and/or desires) of a potential consumer. For example, the feature component 312 can determine that a potential consumer requires a SDV with a high available occupancy based on video data that indicates that the potential consumer has a large family (e.g., video data showing the potential consumer engaging in the subject event with four people (e.g., another adult, etc.)). In another example, the feature component 312 can determine that the potential consumer requires a SDV with fast acceleration and a high top speed based on audio data that indicates that the potential consumer likes fast vehicles (e.g., a recording of the potential consumer stating, "the faster, the better!"). In another example, the feature component 312 can determine that the potential consumer requires a blue SDV based on a customer preference set by the potential consumer (e.g., the potential consumer setting the hue to blue as his/her preferred choice). Thus, the feature component 312 can determine one or more event requirements of a potential consumer based on inputs received by the server 302.

Further, the feature component 312 can identify one or more distinguishing features of one or more SDVs based on the one or more determined event requirements. The memory 316 can include a distinguishing feature database 328. The distinguishing feature database 328 can include one or more distinguishing features regarding one or more SDVs. The presentation component 308 can be directly coupled to the memory 316, thereby enabling the feature component 312 to access the distinguishing feature database 328. By identifying the one or more distinguishing features based on the one or more determined event requirements, the feature component 312 can identify one or more distinguishing features that are likely to encourage the potential consumer to complete an event (e.g., buy a SDV).

The one or more distinguishing features in the distinguishing feature database 328 can regard, but are not limited to: handling specifications, seat arrangement (e.g., total rows of seats and the capacity of seats to fold and/or move), total possible occupancy, storage capacity, hue (e.g., black, blue, or white), size (e.g., two door, four door, sedan, SUV, or truck), safety ratings, top speed, fuel economy, make of the SDV, model of the SDV, acceleration, deceleration, longevity, structural shape, towing capacity, comfort of the seats (e.g., seats with adjustable lumbar support, heated seats, and message seats), forward-collision warning, automatic emergency braking, backup camera, rear cross-traffic alert, blind spot monitoring, BLUETOOTH® connectivity, availability of high definition (HD) radio channels, availability of one or more universal serial buses (USBs), voice controls, heated steering wheel, dual-zone automatic climate control, automatic high beams, spare tire, keyless entry, keyless locking, gesture recognition, digital versatile disc (DVD) player, blue-ray player, built-in navigation, automatic start, Wi-Fi, traction settings, lane-keeping assist, built-in vacuum, one or more built in televisions, self-cleaning windows, heated wiper blades, type of transmission (e.g., automatic or manual), a sunroof, augmented reality displays, surround sound, automatic parallel and perpendicular parking systems, cruise control, power windows, two-wheel and/or four-wheel drive, auto-pilot, camera resolution, interior upholstery materials (e.g., leather, cloth, wood, carbon fiber, stainless steel), collision airbags, manufacturing year, wear and tear of SDV (e.g., the total number of miles traveled by the SDV), maintenance frequency, maintenance costs (e.g., availability and cost of replacement parts), and/or a combination thereof.

For example, the feature component 312 can identify a third row of seats as a distinguishing feature of one or more SDVs based on the determined event requirement that the SDVs have high available occupancy. In another example, the feature component 312 can identify an acceleration of zero to sixty miles per hour (mph) in under four seconds and a top speed of 180 mph as distinguishing features of one or more SDVs based on the determined event requirement that the SDV have fast acceleration and a high top speed. In another example, the feature component 312 can identify a blue exterior paint as a distinguishing feature of one or more SDVs based on the determined event requirement that the SDV be the hue blue. Thus, the feature component 312 can identify one or more distinguishing features based on the one or more determined event requirements.

The task component 314 can identify one or more tasks to be performed by one or more SDVs based on inputs received by the reception component 310, distinguishing features identified by the feature component 312, or a combination thereof. The memory 316 can include a task database 330. The task database 330 can include one or more tasks that can be performed by one or more SDVs. The presentation component 308 can be directly coupled to the memory 316, thereby enabling the task component 314 to access the task database 330. As used herein, the term "task" can refer to a set of instructions depicting one or more actions to be performed by one or more SDVs that demonstrate one or more distinguishing features of the SDV and/or facilitate progression of the subject event.

One or more tasks that in the task database 330 can include, but are not limited to, navigational tasks (e.g., instructions depicting a location, which a SDV can navigate to, instructions depicting how a SDV should navigate to a location, instructions depicting a route a SDV should navigate, instructions depicting a route for a test drive, or a combination thereof); performance tasks (e.g., instructions depicting a maneuver or operation to be performed by a SDV, such as opening doors, closing doors, flashing headlights, revving the engine of the SDV, demonstrating precision turning, demonstrating acceleration capacity, and demonstrating braking capacity); audio tasks (e.g., playing a pre-recorded script that describes one or more distinguishing features of a SDV, asking questions regarding the potential consumer and/or the subject event, offering a test drive of a SDV, or a combination thereof); choreography tasks (e.g., performing pre-determined choreography routines by one or more SDVs, such as two or more SDVs driving in-between each other, crossing routes, or otherwise driving in concert; the choreography tasks can instruct the SDVs to present their features in a particular choreographed manner, providing audio, visual, and SDV driving behaviors in a concert of marketing information and planned selling contexts); parking tasks (e.g., identifying available parking locations and analyzing potential costs, such as opportunities costs, associated with parking in the location); and event tasks (e.g., instructions coordinating one or more SDVs to conduct an event such as a car show, an air show, a boat show, or a parade).

The task component 314 can also send the one or more identified task to one or more SDV interfaces 303 to instruct one or more SDVs. Although FIG. 3 shows only one SDV interface 303, multiple SDV interfaces 303 are also envisaged. The task component 314 can be directly coupled to the one or more SDV interfaces 303 or be in communication with the one or more SDV interfaces 303 via one or more networks 306. In various embodiments, the task component 314 can send the one or more identified tasks to one or more SDV interfaces 303 individually or simultaneously. For example, movements of one or more SDVs can be coordinated by the server 302 and sent to one or more SDV interfaces 303 sequentially or simultaneously. For example, the task component 314 can identify and send tasks to the one or more SDVs to facilitate access and parking of the SDVs, presentations of the SDVs, and test drives of the SDVs.

For example, the task component 314 can identify one or more navigational tasks in response to geographical data received by the reception component 310. In one embodiment, the geographical data can be collected and sent from one or more control modules 304. In another embodiment, the geographical data can be collected and sent from one or more SDV interfaces 303. For example, the control module 304 can identify (e.g., via a geofence system) when a potential consumer enters an event location (e.g., a car dealership) and send geographical data regarding the potential consumer's position within the event location to the reception component 310; whereupon the task component 314 can identify and send one or more navigational tasks to one or more SDVs based on the geographical data. The geographical data can denote the location of a potential consumer, the location of the subject event, or a combination thereof. The navigational task can include instructions for the SDV(s) to drive to the potential consumer's location. Additionally, the navigational task can instruct the SDV how to drive to the potential consumer's location (e.g., a flight plan, instructions to drive under or over a predetermined speed, instructions to circle around the potential consumer a defined number of times, instructions to take a specific route in navigating to the potential consumer's location, or a combination thereof). Thus, for example, a potential consumer can physically enter a location of a subject event (e.g., a car, boat, or aircraft dealer), whereupon a control module 304 can automatically collect and send geographical data regarding the potential consumer's location to the presentation component 308, that in turn can identify and one or more navigational tasks (e.g., approach and park near the potential consumer) to be performed by one or more SDVs and can instruct one or more SDV interfaces 303 to complete the navigational tasks.

In another example, one or more SDV interfaces 303 can collect and send geographical data to the reception component 310 regarding past, current, and/or future locations of the SDV; whereupon the task component 314 can identify and send one or more navigational tasks to one or more SDV interfaces 303 based on the geographical data.

In another example, a potential consumer can set a custom preference in the control module 304 indicating a desired time, date, and place the potential consumer desires to engage in the subject event; whereupon the task component 314 can identify one or more navigational tasks and send the navigational task to one or more SDV interfaces to perform. Thus, for example, a potential consumer can set a desired location of a subject event (e.g., a custom preference), such as the potential consumer's home address, via a control module 304, whereupon the control module 304 can send the custom preference to the presentation component 308. In turn, the task component 314 can identify one or more navigational tasks (e.g., drive from a present location to the home address at the designated date and time, and park near the potential consumer) to be performed by one or more SDVs and can instruct one or more SDV interfaces 303 to complete the navigational tasks.

In another example, the task component 314 can identify one or more audio tasks that elaborate upon one or more distinguishing features of one or more SDVs, and can instruct one or more SDV interfaces 303 to play the audio task to a potential consumer (e.g., via the audio component 324). The one or more audio tasks can include a script describing one or more distinguishing features of a SDV. Thus, the task component 314 can identify an audio task based on the one or more distinguishing features determined by the feature component 312, and can send the audio task to the SDV interface 303 to play for the potential consumer via the audio component 324. For example, the one or more distinguishing features can be a third row of seats in the SDV and the audio task can include reading of a script that describes that the SDV has a third row of seats to increase the total occupancy potential of the SDV.

In another example, the task component 314 can identify one or more performance tasks that demonstrate one or more distinguishing features of one or more SDVs, and can instruct one or more SDV interfaces 303 to conduct the performance tasks in the presence of a potential consumer. The one or more performance tasks can include autonomous opening and closing of one or more doors of a SDV. Thus, the task component 314 can identify a performance task based on the distinguishing feature determined by the feature component 312, and can send the performance task to the SDV interface 303 to be conducted in the presence of the potential consumer. For example, the distinguishing feature can be automatic doors of a SDV and the performance task can include automatically opening and closing one or more doors of the SDV as the potential consumer enters or exits the SDV to demonstrate the ease of access of a SDV (a distinguishing feature that may be of particular interest to a potential consumer who finds the manipulation of doors to be difficult).

The SDV interface 303 can include video component 322, audio component 324, and location component 326. Also, the SDV interface 303 can further include a second reception component 332 and an operations component 336. The SDV interface 303 can be a part of a SDV and can induce or facilitate one or more operations of the SDV. For example, the second reception component 332 can receive the one or more tasks identified and sent by the presentation component 308, and the operations component 336 can control operations (e.g., motor operations) of the SDV in order to perform the task.

In various embodiments, the video component 322 can include one or more cameras positioned on the exterior of a SDV, the interior of a SDV, or a combination thereof. The one or more cameras can facilitate the navigation of a SDV to maneuver around obstacles and within defined parameters (e.g., within a defined lane of a roadway). Also, the one or more cameras can capture video data of a potential consumer and/or the potential consumer's gestures. For example, the video component 322 can capture one or more images of a potential consumer's face in order to determine cognitive expression (e.g., determine if the potential consumer is smiling, surprised, frowning, etc.). In another example, the video component 322 can capture one or more images of a potential consumer's body language (e.g., a potential consumer pointing at a SDV). Further, the video component 322 can capture one or more images of the environment, persons, and/or things in proximity to a SDV. Also, the video component 322 can track the gaze of one or more potential consumers to facilitate determinations regarding the potential consumer's focus on one or more features.

In various embodiments, the audio component 324 can include one or more microphones and speakers on the exterior of a SDV, the interior of a SDV, or a combination thereof. The microphone can capture audio data of one or more potential consumers. Thus, the audio component 324 can record sounds (e.g., conversations, and/or the barking of a dog) originating from inside or outside the SDV. Also, the audio component 324 can audibly express questions to the potential consumer and listen for responses to the questions in order to facilitate the identification of one or more event requirements.

The control module 304 can include settings component 334 and second location component 338. The settings component 334 can receive custom preferences set by one or more potential consumers. The control module 304 can be any computer device capable of receiving custom preferences and sending the preferences to the server 302. Example control modules 304 include, but are not limited to: a computer, a smart phone, a computer tablet, a wearable smart device (e.g., a smart watch), or a kiosk. In an embodiment, the control module 304 can be separate from a SDV (e.g., a potential consumer's smart phone). In another embodiment, the control module 304 can be a part of the SDV (e.g., an onboard computer, or a designated button built into the SDV). For example, a button located in an SDV serving as a taxi can act as the control module 304, wherein pressing the button sets the make and model of the SDV as custom preferences and begins a subject event. The settings component 334 can also analyze a potential consumer's gestures to receive one or more custom preferences. For example, the control module 304 can be a smart watch that can track the hand movement of a potential consumer, and the settings component 334 can analyze the hand movement to facilitate determinations of a point of interest. Additionally, the control module 304 can be communication with auxiliary systems in the environment of the potential consumer that can facilitate setting custom preferences. For example, the control module 304 can be in communication with a surveillance camera at a dealership, wherein the surveillance camera can analyze a hue of the vehicle the potential consumer utilized to arrive at the dealership, and the control module 304 can identify the hue as a custom preference.

The second location component 338 can collect and send geographical data regarding the location of the control module 304. For example, the second location component 338 can use a global position system to determine a location of a potential consumer. Also, the second location component 338 can utilize Wi-Fi triangulation to detect the movement of one or more potential consumers at a location of the subject event.

In an embodiment, the system 300 can include a server 302 in communication with one or more control modules 304 and one or more SDV interfaces 303. The server 302 can be separate from a SDV and communicate with the control module 304 and the SDV interface 303 via one or more networks 306. In another embodiment, the server 302 can be a part of a SDV, communicate directly with the SDV interface 303, and communicate with the control module via the one or more networks 306. In another embodiment, the server 302 can be a part of a SDV and communicate directly with both the SDV interface 303 and the control module 304.

Figure 4:
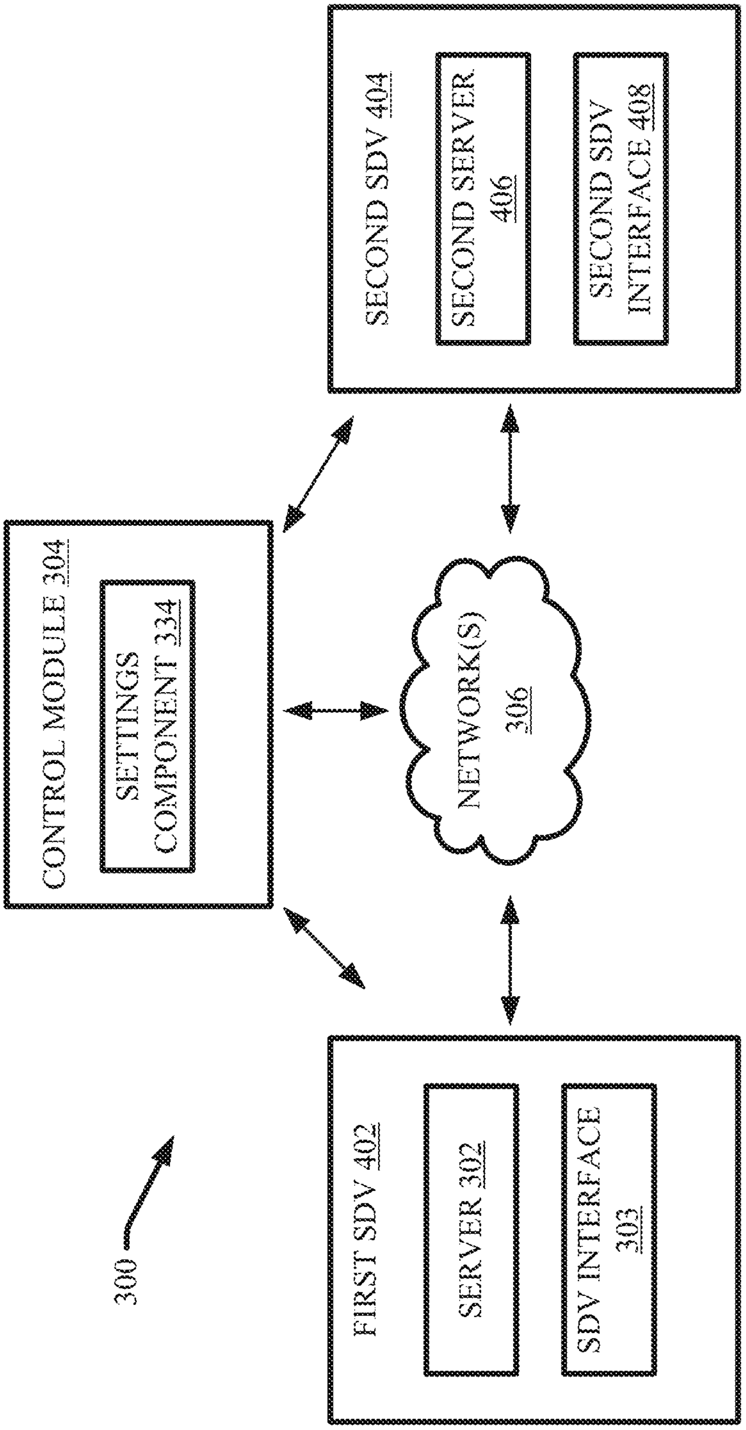
FIG. 4 illustrates an example, non-limiting system that facilitates communication between multiple self-driving vehicles in accordance with one or more embodiments of the present invention.

FIG. 4 illustrates a first SDV and a second SDV communicating in accordance with one or more embodiments of the present invention. Repetitive description of like elements employed in other embodiments described herein is omitted for sake of brevity. As depicted, a first SDV 402 can include a server 302 and a SDV interface 303. Additionally, the second SDV 404 can include a second server 406 and a second SDV interface 408. The second server 406 can include the type of components and perform the same functions as the server 302 described in various embodiments of the present invention. Also, the second SDV interface 408 can the type of components and perform the same functions as the SDV interface 303 described in various embodiments of the present invention. While FIG. 4 illustrates a single second SDV 404, multiple second SDVs 404 are also envisaged.

The first SDV 402 and the second SDV 404 can communicate via one or more networks 306. The first SDV 402 can communicate with the control module 304 directly or via the one or more network 306. Also, the second SDV 404 can communicate with the control module 304 directly or via the network 306. The first SDV 402 and the second SDV 404 can share information (e.g., observations, identified distinguishable features, identified tasks, or a combination thereof) to coordination and create a consumer experience for optimal marketing of a SDV or SDV service to the potential buyer. In other words, the first SDV 402 and the second SDV 404 can share information during the subject event to facilitate encouraging the potential consumer to complete the event. For example, the first SDV 402 (e.g., a red colored SDV) can be performing one or more tasks to demonstrate a distinguishable feature of the first SDV 402 when the SDV interface 303 can observe the potential consumer comment that blue is his/her favorite hue. In response to the potential consumer's comment, the server 302 can send a one or more navigational tasks to the second SDV 404 instructing the second SDV 404 to approach the potential consumer. Also, the first SDV 402 can share with the second SDV 404 any distinguishing features and/or inputs identified during the subject event. Thus, the first SDV 402 and one or more second SDV 404 can cooperate to present to the potential consumer a SDV that is most likely to meet the potential consumer's event requirements.

Additionally, due at least in part to the communication capacities of the system 300, the first SDV 402 and the second SDV 404 can perform in conjunction to demonstrate one or more tasks. For example, one or more navigational tasks can be shared between the first SDV 402 and the second SDV 404 to enable the SDVs to perform a choreographed routine (e.g., a parade of SDVs) so that the potential consumer can see the characteristics of each SDV along-side another SDV.

In another example, the first SDV 402 and the second SDV 404 can utilize shared geographical data to park and/position the SDVs. For example, the SDV interface 303 and the second SDV interface 408 can park the first SDV 402 and the second SDV 404 in line facing the potential consumer during an event. In another example, the SDV interface 303 and the second SDV interface 408 can park the first SDV 402 and the second SDV 404 in closed proximity (e.g., within a couple of inches). For example, close proximity parking can be facilitate the conservation of space, particularly when the SDVs are not engaging in an event.

Referring again to FIG. 3 the system can include event component 340 and configuration component 342. In various embodiments, the server 302 can include event component 340 to facilitate presenting the potential consumer with event information relating to the subject event. In one embodiment, the event component 340 can send the information to the SDV interface 303 to be conveyed to the potential consumer (e.g., the information can be conveyed verbally to the consumer via the audio component 324, visually via the video component 322, or via a combination thereof). In another embodiment, the event component 340 can electronically send the information to an email or other electronic account of the potential consumer via the network 306. The event information can include, but is not limited to: terms and conditions regarding the purchase of a SDV (e.g., monetary costs, and/or the like); terms and conditions regarding the leasing of a SDV (e.g., monetary costs, duration of lease, condition of SDV, and/or the like); interest rates; insurance options; terms and conditions, such as monetary costs and liability assessments, to hire a SDV for a service (e.g., taxi service, limousine services, surveillance services, photography services, delivery services, etc.); and custom surveys (e.g., the event component can send a survey that can be generated based on the determined distinguishable features, the identified tasks, the collected observations, or a combination thereof).

In various embodiments, the SDV interface 303 can include configuration component 342 to facilitate adjusting one or more features of a SDV on-the-fly. The configuration component 342 can adjust one or more features of a SDV on-the-fly in response to one or more tasks sent by the task component 314, so as to render the SDV more appealing to a potential consumer. For example, the audio component 324 can observe the potential consumer commenting that he/she enjoys a wide variety of music, the feature component 312 can identify a capacity of the SDV to play HD radio channels as a distinguishing feature, the task component 314 can send a task to the SDV interface 303 to enable HD radio in the SDV, and the configuration component 342 can adjust radio characteristics of the SDV from standard radio (e.g., the default configuration) to HD radio on-the-fly. Thus, the configuration component 342 can adjust one or more parameters of a SDV to demonstrate how the SDV performs with enhanced features.

In another embodiment, a SDV can be in communication with the server 302 at the request of a owner of the SDV to make the SDV available for an event. For example, the owner of a SDV can set a custom preference via the control module 304 indicating that the owner wishes to make the SDV available for an event (e.g. sale, lease, rent). The setting component 334 can send the preference (e.g. indicating the SDV is available for purchase) to the server 302. Additionally, the owner can set custom preferences regarding the parameters of the event (e.g. the days and times the SDV will be available to participate in the subject event). Also, the server 302 can generate a description of the owner's SDV and notify/publish the description to potential consumers.

Once the server 302 receives the custom preference from the settings component 334, the system 300 can facilitate the subject event as described above with reference to various embodiments of the present invention. For example, the server 302 can receive custom preferences from a control module 304 associated with a potential consumer (e.g. the selection of a desired SDV from a website or computer application), identify one or more tasks to be performed by the SDV of the owner, and instruct the SDV to perform the tasks (e.g. navigational tasks which instruct the SDV to leave its current location, such as the owner's residency, and travel to a desired event location). Additionally, the server 302 can send and/or receive event information (e.g. via the event component 340) to facilitate negotiations between the owner and potential consumer. Alternatively, the server 302 can put the owner and potential consumer in direct communication.

Figure 5:
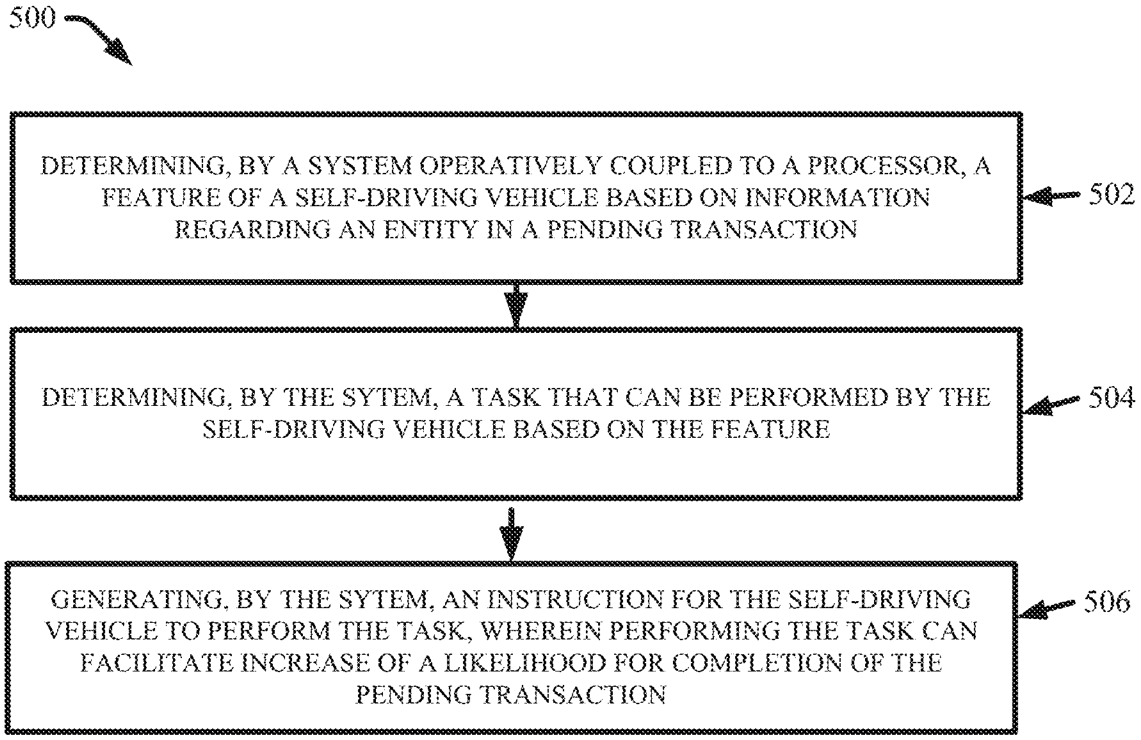
FIG. 5 illustrates a flow diagram of an example, non-limiting computer-implemented method in accordance with one or more embodiments of the present invention.

FIG. 5 illustrates a flow diagram of an example, non-limiting computer implemented method in accordance with one or more embodiments of the present invention. Repetitive description of like elements employed in other embodiments described herein is omitted for sake of brevity. At 502, the method 500 can include determining, by a system 300 operatively coupled to a processor 318, a feature of a self-driving vehicle based on information regarding an entity in a pending event. At 504, the method 500 can also include determining, by the system 300, a task that can be performed by the self-driving vehicle based on the feature. At 506, the method 500 can further include generating, by the system 300, an instruction for the self-driving vehicle to perform the task. The task can facilitate increase of a likelihood for completion of the pending event.

Figure 6:
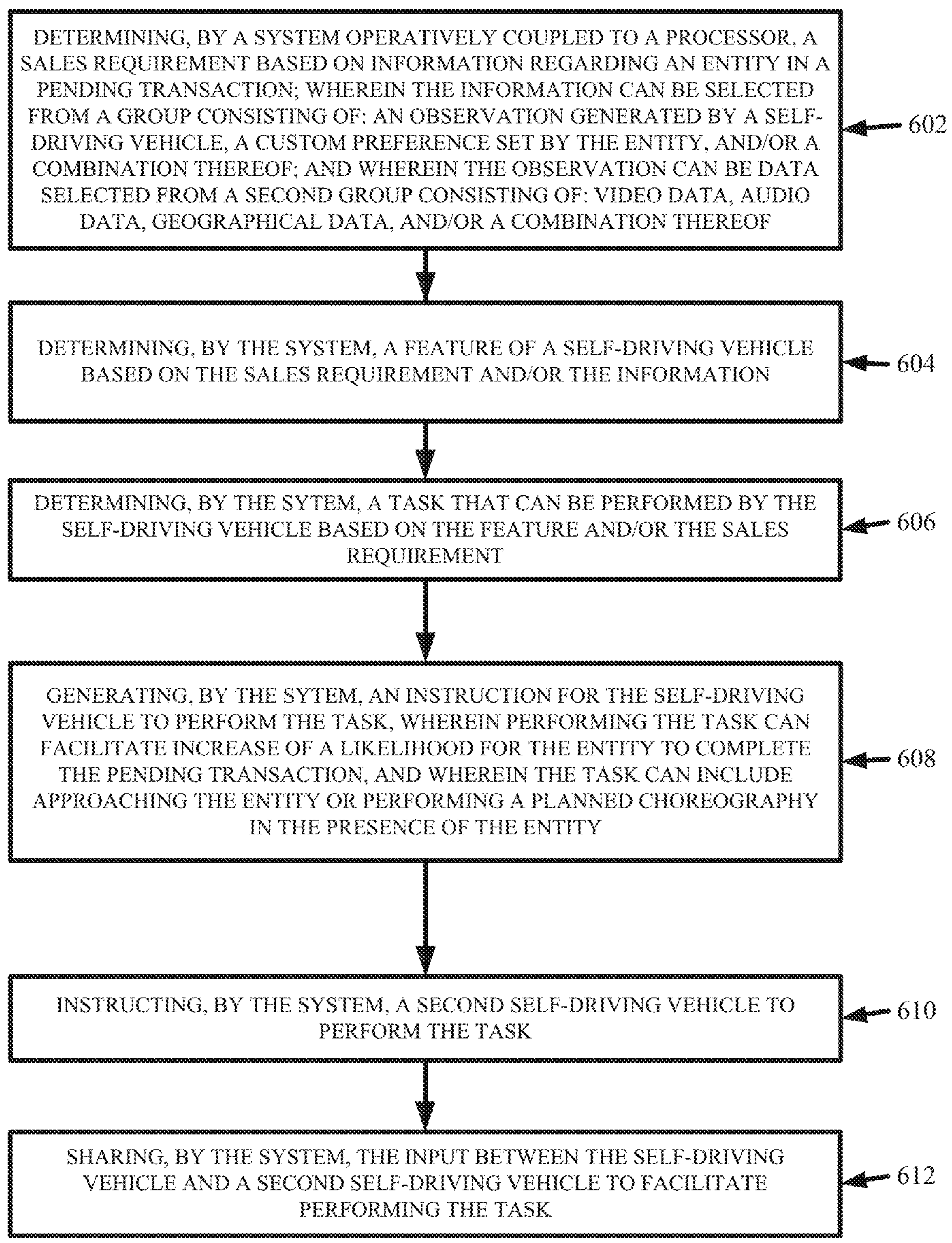
FIG. 6 illustrates another example, non-limiting computer-implemented method in accordance with one or more embodiments of the present invention.

FIG. 6 illustrates another example, non-limiting computer implemented method accordance with one or more embodiments of the present invention. Repetitive description of like elements employed in other embodiments described herein is omitted for sake of brevity. At 602, the method 600 can include determining, by a system 300 operatively coupled to a processor 318, an event requirement based on information regarding an entity in a pending event. The information can be selected from a group consisting of: an observation generated by a SDV, a custom preference set by the entity, and/or a combination thereof. The observation can be data selected from a second group consisting of: video data, audio data, geographical data, and/or a combination thereof. At 604, the method 600 can include determining, by the system 300, a feature of a self-driving vehicle based the event requirement and/or the information. The event requirement can represent a need or want of the entity. At 606, the method 600 can include determining, by the system 300, a task that can be performed by the self-driving vehicle based on the feature and/or the event requirement. At 608, the method 600 can also include generating, by the system 300, an instruction for the self-driving vehicle to perform the task. Performing of the task can facilitate increase of a likelihood for the entity to complete the pending event. Further, the task can include approaching the entity or performing a planned choreography in the presence of the entity. At 610, the method 600 can include instructing, by the system 300, a second SDV to perform the task. Moreover, at 612, the method 600 can include sharing by the system 300, the information between the SDV (e.g., first SDV 202) and the second SDV (e.g., second SDV 204) to facilitate performing the task.

Figure 7:
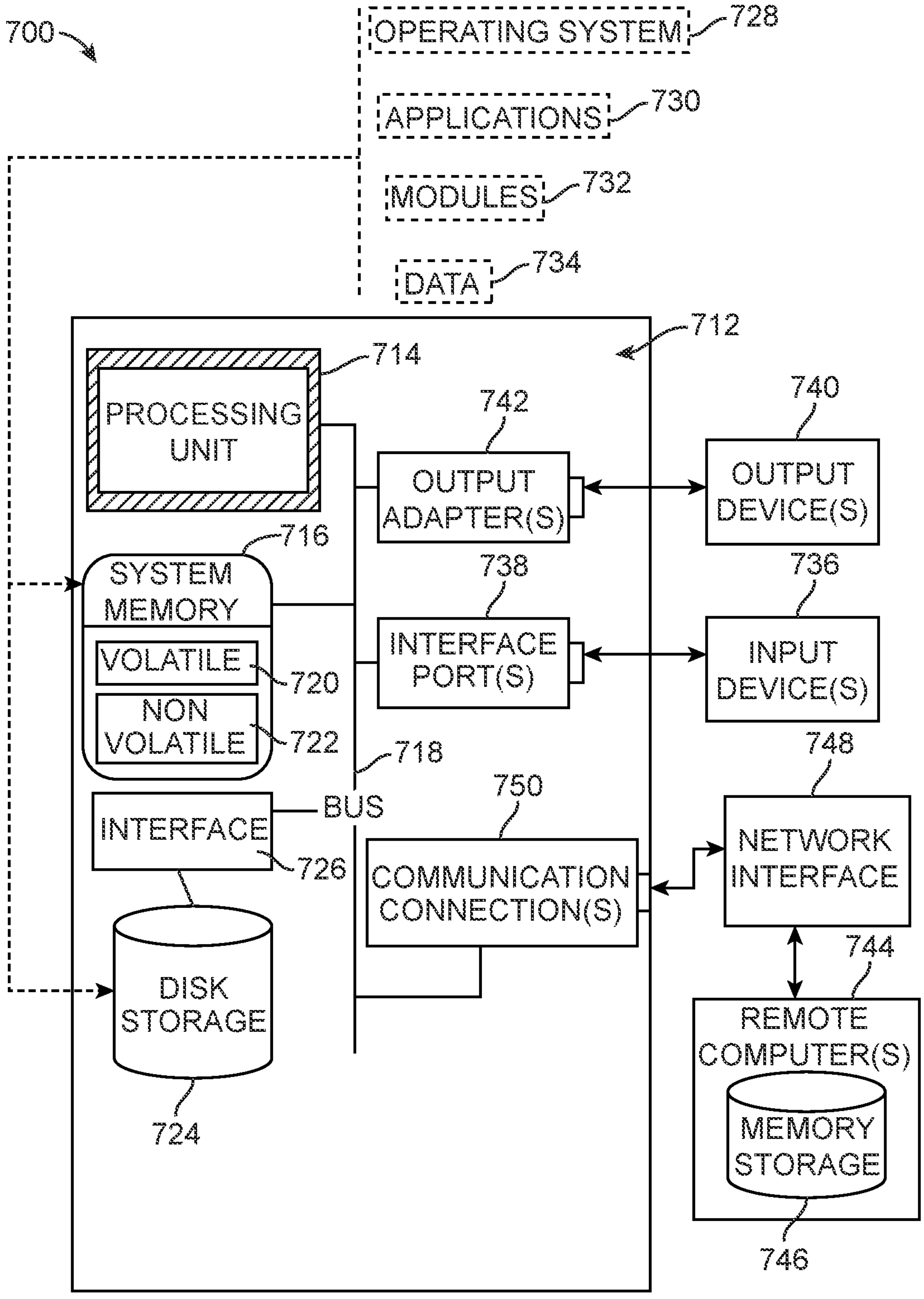
FIG. 7 illustrates a block diagram of an example, non-limiting operating environment in accordance with one or more embodiments of the present invention.

In order to provide a context for the various aspects of the disclosed subject matter, FIG. 7 as well as the following discussion are intended to provide a general description of a suitable environment in which the various aspects of the disclosed subject matter can be implemented. FIG. 7 illustrates a block diagram of an example, non-limiting operating environment in accordance with one or more embodiments of the present invention. Repetitive description of like elements employed in other embodiments described herein is omitted for sake of brevity. With reference to FIG. 7, a suitable operating environment 700 for implementing various aspects of this disclosure can include a computer 712. The computer 712 can also include a processing unit 714, a system memory 716, and a system bus 718. The system bus 718 operably couples system components including, but not limited to, the system memory 716 to the processing unit 714. The processing unit 714 can be any of various available processors. Dual microprocessors and other multiprocessor architectures also can be employed as the processing unit 714. The system bus 718 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 716 can also include volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 720 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 712 can also include removable/non-removable, volatile/nonvolatile computer storage media. FIG. 7 illustrates, for example, a disk storage 724. Disk storage 724 can also include, but is not limited to, devices like a magnetic disk drive, floppy disk drive, tape drive, Jaz drive, Zip drive, LS-100 drive, flash memory card, or memory stick. The disk storage 724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 724 to the system bus 718, a removable or non-removable interface is typically used, such as interface 726. FIG. 7 also depicts software that acts as an intermediary between users and the basic computer resources described in the suitable operating environment 701. Such software can also include, for example, an operating system 728. Operating system 728, which can be stored on disk storage 724, acts to control and allocate resources of the computer 712. Applications 730 take advantage of the management of resources by operating system 728 through program modules 732 and program data 734, e.g., stored either in system memory 716 or on disk storage 724. It is to be appreciated that this disclosure can be implemented with various operating systems or combinations of operating systems. For example, method 500 can be embodied as a software and related data (e.g. as the applications 730, the modules 732, and/or the data 734 depicted in FIG. 7). Also, the system 728 can include reception component 312 that receives an input regarding an entity in a pending event. Further, the system 728 can include task component 314 that identifies a task to be performed by a self-driving vehicle based on the input and instructs the self-driving vehicle to perform the task, wherein performing the task encourages the entity to complete the pending event. A user enters commands or information into the computer 712 through one or more input devices 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and/or the like. These and other input devices connect to the processing unit 714 through the system bus 718 via one or more interface ports 738. Interface port 738 include, for example, a serial port, a parallel port, a game port, and a universal serial bus (USB). One or more Output devices 740 can use some of the same type of ports as input device 736. Thus, for example, a USB port can be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer 744.

Computer 712 can, for example, determine a feature of a self-driving vehicle based on information regarding an entity in a pending event. Also, computer 712 can determine a task to be performed by the self-driving vehicle based on the feature. Further, computer 712 can generate an instruction for the self-driving vehicle to perform the task, wherein the performing the task facilitates increase of a likelihood for the entity to complete the pending event. The information regarding the entity can be selected by computer 712 from a group consisting of: an observation generated by the self-driving vehicle, a custom preference set by the entity, and/or a combination thereof. Computer 712 can also determine a event requirement based on the information. The event requirement can represent a need or want of the entity. Moreover, computer 712 can identify the feature of the self-driving vehicle based on the event requirement. Additionally, computer 712 can instruct a second self-driving vehicle to perform the task. Furthermore, computer 712 can share the information between the self-driving vehicle and the second self-driving vehicle to facilitate performing the task. The task can be to approach the entity or to perform a choreography in the presence of the entity.

Computer 712 can operate in a networked environment using logical connections to one or more remote computers, such as remote computer 744. The one or more remote computers 744 can be a computer, a server, a router, a network PC, a workstation, a microprocessor based appliance, a peer device or other common network node and/or the like, and typically can also include many or all of the elements described relative to computer 712. For purposes of brevity, only a memory storage device 746 is illustrated with remote computer 744. Remote computer 744 is logically connected to computer 712 through a network interface 748 and then physically connected via communication connection 750. Further, operation can be distributed across multiple (local and remote) systems. Network interface 748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and/or the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 750 refers to the hardware/software employed to connect the network interface 748 to the system bus 718. While communication connection 750 is shown for illustrative clarity inside computer 712, it can also be external to computer 712. The hardware/software for connection to the network interface 748 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and/or the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A self-driving vehicle system, comprising:
- a plurality of self-driving vehicles, each of the plurality of self-driving vehicles having a seating capacity of one or more persons and being associated with one or more technical features; and
- a server in communication with the plurality of self-driving vehicles, the server being geographically separate from the plurality of self-driving vehicles, the server comprising:
- a processor; and
- a memory that stores computer executable instructions, the computer executable instructions when executed by the processor, cause the processor to:
- receive a selection from a consumer regarding an event, the event comprising a sales transaction, the selection specifying an event location for the sales transaction and one or more technical features of a self-driving vehicle to be selected for the event, wherein receiving the selection comprises:
  - obtaining contextual information related to the consumer and the event;
  - identifying, based on the obtained contextual information, event requirements from the consumer;
  - identifying candidate technical features of the self-driving vehicle for meeting the identified event requirements;
  - presenting the identified candidate technical features of the self-driving vehicle to the consumer for selection; and
  - receiving, from the consumer, the selection of the one or more technical features of the self-driving vehicle;
- select one of the plurality of self-driving vehicles based on the selection regarding the event and based on the one or more technical features of the selected self-driving vehicle, wherein the selected self-driving vehicle is available to complete the sales transaction and the selected self-driving vehicle has one or more technical features that meet the one or more requirements of the event specified in the selection from the consumer; and
- generate a task for the selected self-driving vehicle to perform, wherein the task comprises a delivery service that moves the selected self-driving vehicle from a first geographical location to a second geographical location along a route, the first geographical location or the second geographical location being the event location associated with the sales transaction selected by the consumer, and wherein the task further comprises performing a parking task comprising:
  - identifying a plurality of available parking locations for parking the self-driving vehicle; and
  - selecting a parking location for the self-driving vehicle from the plurality of available parking locations based on characteristics of the plurality of parking locations.

2. The self-driving vehicle system of claim 1, wherein the one or more technical features comprises video data regarding visual observations made based on one or more cameras located on an interior of the selected self-driving vehicle or on an exterior of the selected self-driving vehicle.

3. The self-driving vehicle system of claim 1, wherein the one or more technical features comprises geographical data regarding a third geographical location of the selected self-driving vehicle or another self-driving vehicle.

4. The self-driving vehicle system of claim 1, wherein the selected self-driving vehicle comprises a reception component that is capable of receiving an input from the consumer regarding a preference of the consumer.

5. The self-driving vehicle system of claim 4, wherein the selected self-driving vehicle is capable of sharing the input with a second self-driving vehicle, and wherein the second self-driving vehicle and the selected self-driving vehicle are capable of cooperating to perform one or more tasks based on the input for completion of the event with the selected self-driving vehicle.

6. The self-driving vehicle system of claim 4, wherein the selected self-driving vehicle is capable of sharing the input with a second self-driving vehicle, and wherein the second self-driving vehicle and the selected self-driving vehicle are capable of cooperating to perform one or more tasks based on the input for completion of the event with the second self-driving vehicle.

7. The self-driving vehicle system of claim 1, wherein the one or more technical features comprises an available occupancy of the selected self-driving vehicle based on detection of greater than a defined number of entities accompanying the consumer.

8. The self-driving vehicle system of claim 1, wherein the one or more technical features comprises a defined top speed of the selected self-driving vehicle based on detection indicating the consumer prefers the defined top speed greater than a defined value.

9. The self-driving vehicle system of claim 1, wherein the selection is a custom preference set by the consumer.

10. The self-driving vehicle of system claim 1, wherein the sales transaction to purchase of one or more items to be delivered by the selected self-driving vehicle.

11. The self-driving vehicle of system claim 10, wherein the sales transaction is facilitated by a contract being electronically sent to a device associated with the consumer from the server.

12. A computer-implemented method comprising:
- communicating, by a server, with a plurality of self-driving vehicles, each of the plurality of self-driving vehicles having a seating capacity of one or more persons and being associated with one or more technical features, the server being geographically separate from the plurality of self-driving vehicles;
- receiving, by the server, a selection from a consumer regarding an event, the event comprising a sales transaction, the selection specifying an event location for the sales transaction and one or more technical features of a self-driving vehicle to be selected for the event, wherein receiving the selection comprises:
  - obtaining contextual information related to the consumer and the event;
  - identifying, based on the obtained contextual information, event requirements from the consumer;
  - identifying candidate technical features of the self-driving vehicle for satisfying the identified event requirements;
  - presenting the identified candidate technical features of the self-driving vehicle to the consumer for selection; and receiving, from the consumer, the selection of the one or more technical features of the self-driving vehicle;

selecting one of the plurality of self-driving vehicles based on the selection regarding the event and based on the one or more technical features of the selected self-driving vehicle, wherein the selected self-driving vehicle is available to complete the sales transaction and the selected self-driving vehicle has one or more technical features that meet one or more requirements of the event specified in the selection from the consumer; and generating a task for the selected self-driving vehicle to perform, wherein the task comprises a delivery service that moves the selected self-driving vehicle from a first geographical location to a second geographical location along a route, the first geographical location or the second geographical location being the event location associated with the sales transaction selected by the consumer, and wherein the task further comprises performing a parking task comprising:

identifying a plurality of available parking locations for parking the self-driving vehicle; and selecting a parking location for the self-driving vehicle from the pluraltiy of available parking locations based on characteristics of the plurality of parking locations.

13. The computer-implemented method of claim 12, wherein the one or more technical features comprises video data regarding visual observations made based on one or more cameras located on an interior of the selected self-driving vehicle or on an exterior of the selected self-driving vehicle.

14. The computer-implemented method of claim 12, wherein the one or more technical features comprises geographical data regarding a third geographical location of the selected self-driving vehicle or another self-driving vehicle.

15. The computer-implemented method of claim 12, further comprising receiving an input from the consumer regarding a preference of the consumer.

16. The computer-implemented method of claim 15, further comprising causing the selected self-driving vehicle to share the input with a second self-driving vehicle, and wherein the second self-driving vehicle and the selected self-driving vehicle are capable of cooperating to perform one or more tasks based on the input for completion of the event with the selected self-driving vehicle.

17. The computer-implemented method of claim 15, further comprising causing the selected self-driving vehicle to share the input with a second self-driving vehicle, and wherein the second self-driving vehicle and the selected self-driving vehicle are capable of cooperating to perform one or more tasks based on the input for completion of the event with the second self-driving vehicle.

18. A computer program product comprising a computer readable storage medium having program instructions embodied therewith, the program instructions executable by a processor to cause the processor to:

communicate, by a server, with a plurality of self-driving vehicles, each of the plurality of self-driving vehicles having a seating capacity of one or more persons and being associated with one or more technical features, the server being geographically separate from the plurality of self-driving vehicles;

receive, by the server, a selection from a consumer regarding an event, the event comprising a sales transaction, the selection specifying an event location for the sales transaction and one or more technical features of a self-driving vehicle to be selected for the event, wherein receiving the selection comprises:

obtaining contextual information related to the consumer and the event;

identifying, based on the obtained contextual information, event requirements from the consumer;

identifying candidate technical features of the self-driving vehicle for satisfying the identified event requirements;

presenting the identified candidate technical features of the self-driving vehicle to the consumer for selection; and receiving, from the consumer, the selection of the one or more technical features of the self-driving vehicle;

select one of the plurality of self-driving vehicles based on the selection regarding the event and based on the one or more technical features of the selected self-driving vehicle, wherein the selected self-driving vehicle is available to complete the sales transaction and the selected self-driving vehicle has one or more technical features that meet one or more requirements of the event specified in the selection from the consumer; and generate a task for the selected self-driving vehicle to perform, wherein the task comprises a delivery service that moves the selected self-driving vehicle from a first geographical location to a second geographical location along a depicted route, the first geographical location or the second geographical location being the event location associated with the sales transaction selected by the consumer, and wherein the task further comprises performing a parking task comprising:

identifying a plurality of available parking locations for parking the self-driving vehicle; and selecting a parking location for the self-driving vehicle from the plurality of available parking locations based on characteristics of the plurality of parking locations.

19. The computer program product of claim 18, wherein the one or more technical features comprises video data regarding visual observations made based on one or more cameras located on an interior of the selected self-driving vehicle or on an exterior of the selected self-driving vehicle.

* * * * *